US012121118B2

(12) United States Patent
Dudai

(10) Patent No.: US 12,121,118 B2
(45) Date of Patent: Oct. 22, 2024

(54) EMERGENCY ALERT BRACELET ASSEMBLY

(71) Applicant: Autumn Dudai, Kinsman, OH (US)

(72) Inventor: Autumn Dudai, Kinsman, OH (US)

( * ) Notice: Subject to any disclaimer, the term of this patent is extended or adjusted under 35 U.S.C. 154(b) by 298 days.

(21) Appl. No.: 17/678,642

(22) Filed: Feb. 23, 2022

(65) Prior Publication Data

US 2023/0263274 A1 Aug. 24, 2023

(51) Int. Cl.
*A44C 5/00* (2006.01)
*G07C 9/25* (2020.01)
*G08B 25/01* (2006.01)

(52) U.S. Cl.
CPC ............ *A44C 5/0007* (2013.01); *G07C 9/257* (2020.01); *G08B 25/016* (2013.01)

(58) Field of Classification Search
CPC ..... A44C 5/0007; G07C 9/257; G08B 25/016
USPC ..................................................... 340/539.11
See application file for complete search history.

(56) References Cited

U.S. PATENT DOCUMENTS 6,747,561 B1 * 6/2004 Reeves ................. G06F 1/1656 340/573.5
9,069,333 B1 6/2015 Romans
11,308,744 B1 * 4/2022 Exantus ............. G08B 21/0288
2004/0263318 A1 * 12/2004 Dvorak .................. G07C 9/257 340/5.83
2007/0268144 A1 * 11/2007 Dobosz .................. A61B 5/117 340/539.11
2008/0001764 A1 * 1/2008 Douglas ................... G07C 9/28 340/539.11
2008/0101160 A1 5/2008 Besson
2010/0267361 A1 * 10/2010 Sullivan .................. G01S 19/17 455/404.2
2013/0330996 A1 * 12/2013 Benevento ........... A44C 5/0007 446/71
2013/0331058 A1 12/2013 Harvey
2014/0323079 A1 * 10/2014 Paolini ................. G08B 21/043 455/404.2
2018/0025605 A1 * 1/2018 Thomas ................ H04W 4/029 455/90.1
2018/0343985 A1 * 12/2018 Dencek .................. A61B 90/53
2019/0206159 A1 * 7/2019 Benrachi .................. G07C 9/28
2019/0312966 A1 10/2019 Shin
2022/0398914 A1 * 12/2022 Cardona ................. G06F 1/163
2023/0343199 A1 * 10/2023 Ferguson ........... G08B 21/0288

* cited by examiner

*Primary Examiner* — Naomi J Small

(57) ABSTRACT

An emergency alert bracelet assembly for inhibiting a user from being assaulted or kidnapped includes a bracelet that is wearable around a wrist of a user. A locking unit is integrated into the bracelet and the locking unit is actuated to lock the bracelet around the user's wrist to inhibit an unauthorized user from removing the bracelet from the user's wrist. A communication unit is integrated into the bracelet and the communication unit broadcasting an alert signal to contact emergency responders for assistance. A fingerprint scanner is integrated into the bracelet to scan a fingerprint. Furthermore, the locking unit is de-actuated when the fingerprint scanner scans a fingerprint of an authorized user thereby facilitating the bracelet to be removed from the user's wrist.

8 Claims, 4 Drawing Sheets

EMERGENCY ALERT BRACELET ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to emergency alert devices and more particularly pertains to a new emergency alert device for inhibiting a user from being assaulted or kidnapped. The device includes a bracelet which includes a magnetic lock for retaining the bracelet on a user's wrist. The device includes a fingerprint scanner that is integrated into the bracelet and a transceiver that is integrated into the bracelet. The transceiver broadcasts an alert signal when the user scans their fingerprint into the fingerprint scanner. Furthermore, the magnetic lock is disabled when a caregiver scans their fingerprint into the fingerprint scanner.

(2) Description of Related Art Including Information Disclosed Under 37 CFR 1.97 and 1.98

The prior art relates to emergency alert devices including an athletic monitor that includes a wrist watch and biometric sensors integrated into the wrist watch for monitoring physiology of an athlete. The prior art discloses a wrist watch device that includes internal pill storage and a communication unit for contacting 911. The prior art discloses an emergency alert device that is worn on a user's wrist and which automatically places a cellular phone call to 911 in the event of an emergency. The prior art discloses an emergency alert device that includes a first device worn on a user and a second device carried by a caregiver for broadcasting an emergency assistance request between the first device and the second device. The prior art discloses a personal security device that includes a bracelet and a transceiver integrated into the bracelet which is in communication with a wireless communication network.

BRIEF SUMMARY OF THE INVENTION

An embodiment of the disclosure meets the needs presented above by generally comprising a bracelet that is wearable around a wrist of a user. A locking unit is integrated into the bracelet and the locking unit is actuated to lock the bracelet around the user's wrist to inhibit an unauthorized user from removing the bracelet from the user's wrist. A communication unit is integrated into the bracelet and the communication unit broadcasting an alert signal to contact emergency responders for assistance. A fingerprint scanner is integrated into the bracelet to scan a fingerprint. Furthermore, the locking unit is de-actuated when the fingerprint scanner scans a fingerprint of an authorized user thereby facilitating the bracelet to be removed from the user's wrist.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figures 1, 2:
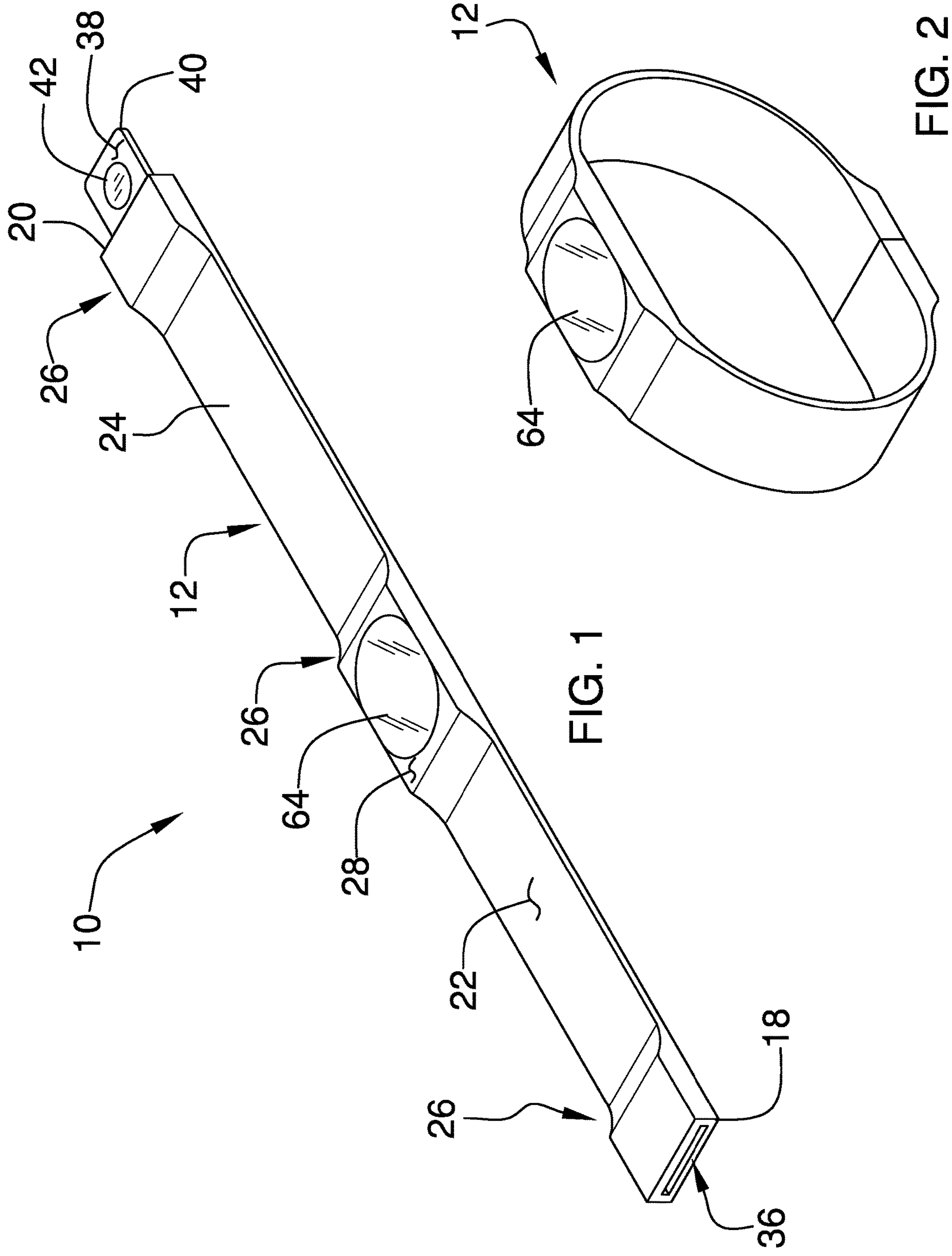
FIG. 1 is a top perspective view of an emergency alert bracelet assembly according to an embodiment of the disclosure.
FIG. 2 is a front perspective view of an embodiment of the disclosure.
Figures 3, 4, 5:
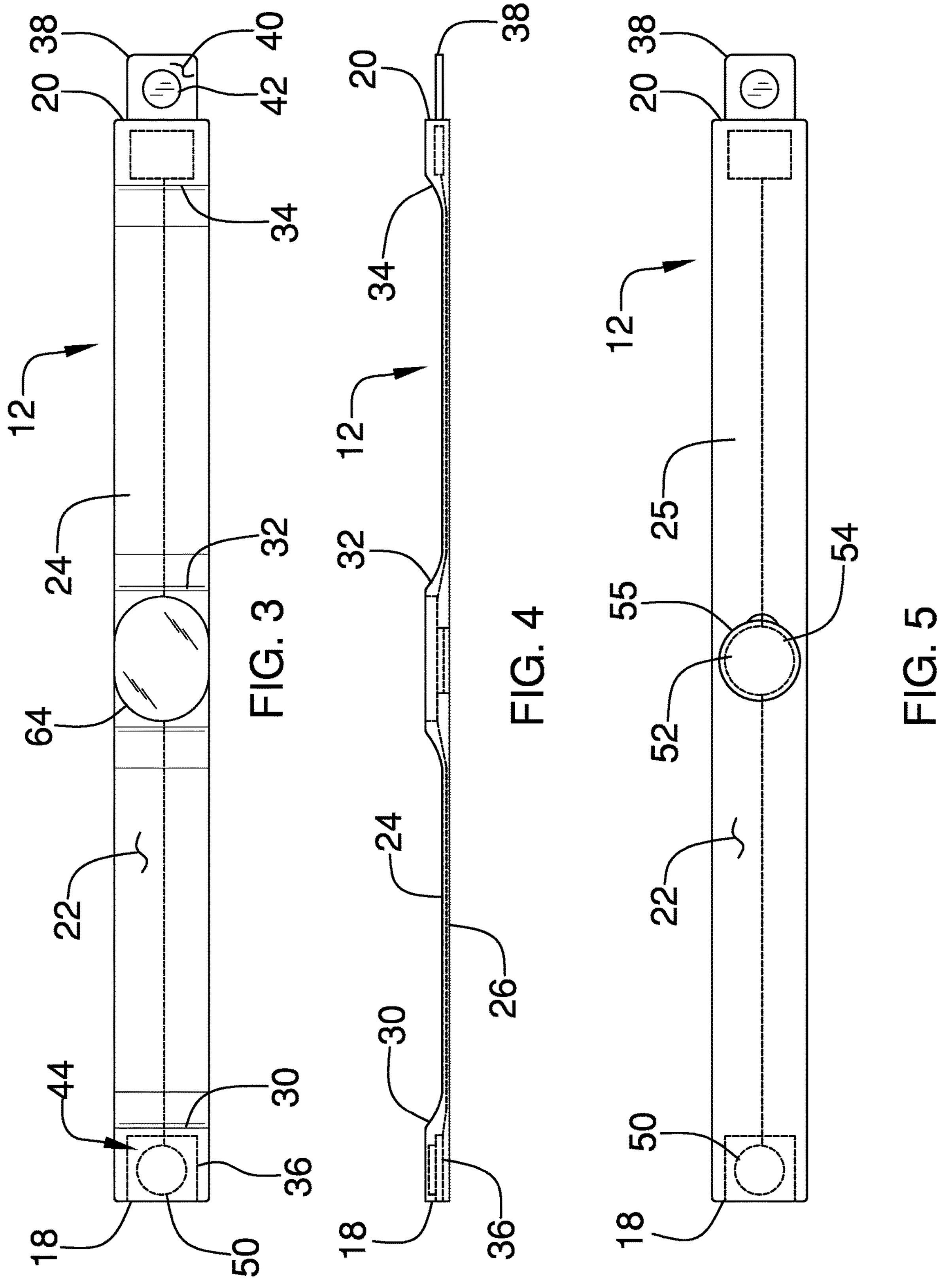
FIG. 3 is a top phantom view of an embodiment of the disclosure.
FIG. 4 is a front phantom view of an embodiment of the disclosure.
FIG. 5 is a bottom phantom view of an embodiment of the disclosure.
Figure 6:
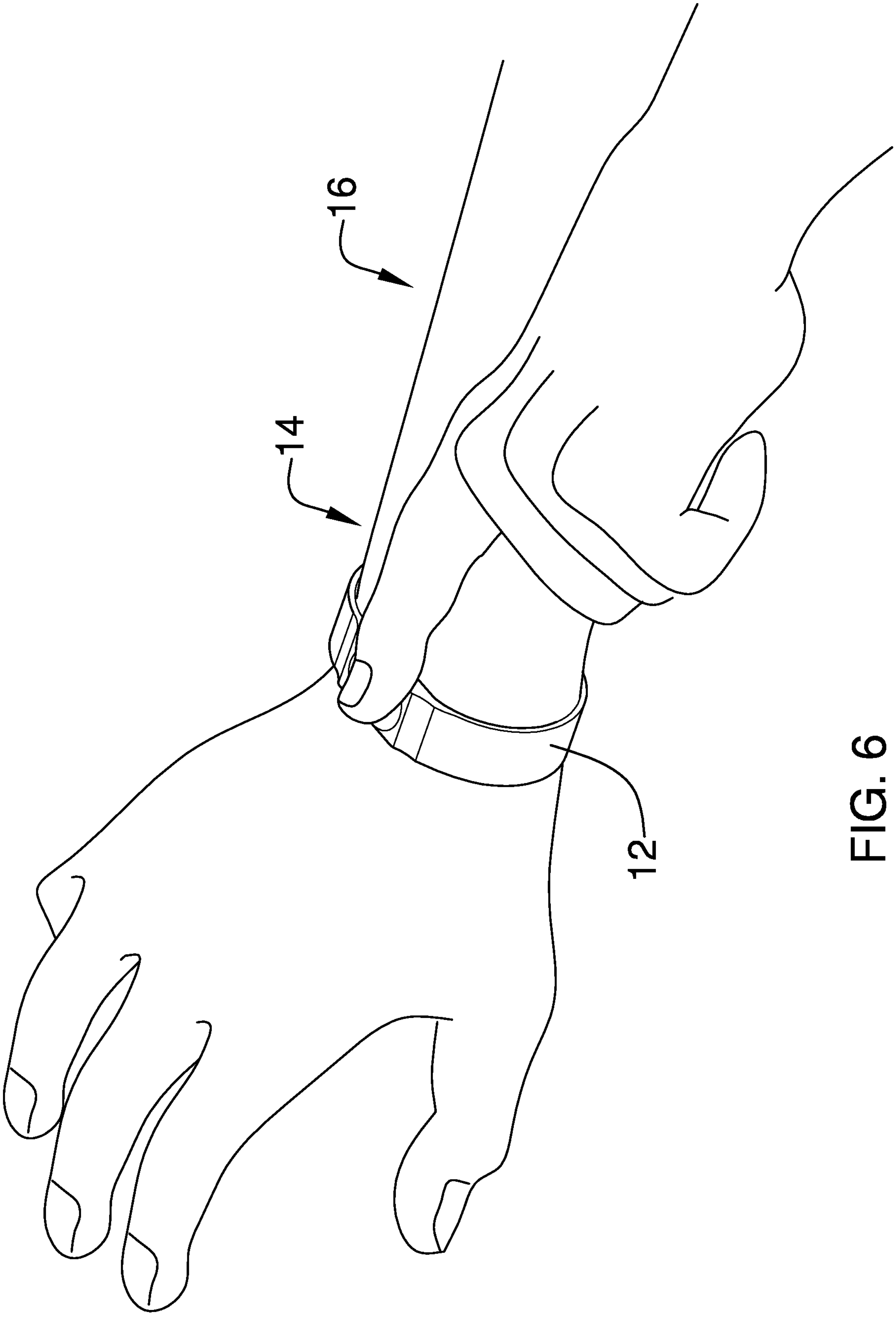
FIG. 6 is a perspective in-use view of an embodiment of the disclosure.
Figure 7:
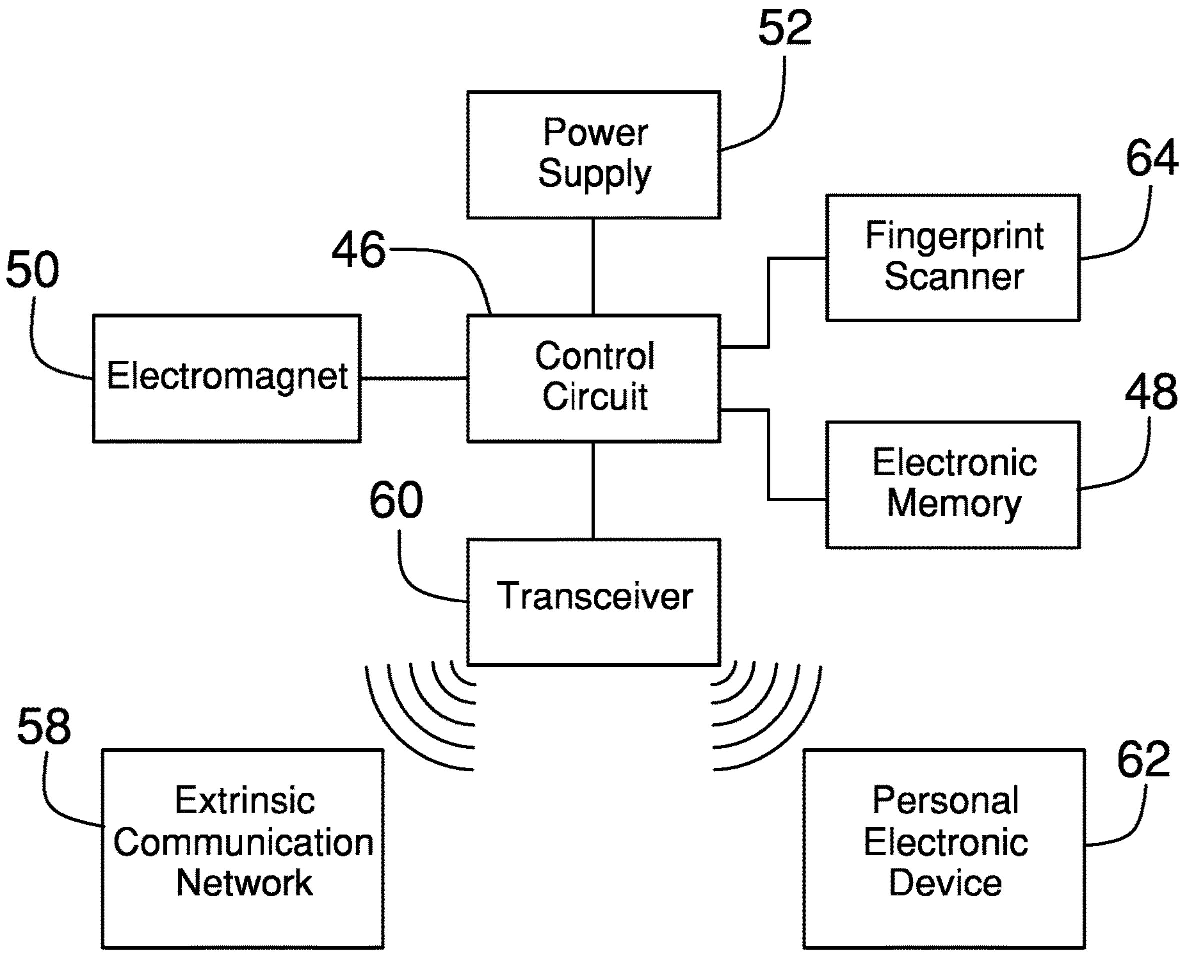
FIG. 7 is a schematic view of an embodiment of the disclosure.

With reference now to the drawings, and in particular to FIGS. 1 through 7 thereof, a new emergency alert device embodying the principles and concepts of an embodiment of the disclosure and generally designated by the reference numeral 10 will be described.

As best illustrated in FIGS. 1 through 7, the emergency alert bracelet assembly 10 generally comprises a bracelet 12 that is wearable around a wrist 14 of a user 16. The bracelet 12 has a first end 18, a second end 20 and an outer surface 22 extending between the first end 18 and the second end 20, and the outer surface 22 has a top side 24 and a bottom side 25. The bracelet 12 has a plurality of prominences 26 each extending upwardly from the top side 24 and each of the prominences 26 has an upper surface 28. Furthermore, the upper surface 28 of each of the prominences 26 lies on a plane that is oriented parallel with the top side 24 of the outer surface 22. The user 16 may be child, a developmentally disabled adult or other individual that requires a caregiver.

The plurality of prominences 26 includes a first prominence 30, a second prominence 32 and a third prominence 34. The first prominence 30 is aligned with the first end 18, the second prominence 32 is centrally positioned between the first end 18 and the second end 20, and the third prominence 34 is aligned with the second end 20. The first end 18 has a well 36 extending toward the second end 20 and the bracelet 12 has a tab 38 extending away from the second end 20. The tab 38 has a top surface 40 and the tab 38 is insertable into the well 36 when the bracelet 12 is worn around the user's wrist 14 such that the bracelet 12 forms a closed loop. A magnet 42 is integrated into the top surface 40 of the tab 38 such that the magnet 42 is positioned within the well 36 in the first end 18 of the bracelet 12 when the tab 38 is inserted into the well 36.

A locking unit 44 is provided and the locking unit 44 is integrated into the bracelet 12. The locking unit 44 is actuated to lock the bracelet 12 around the user's wrist 14 when the bracelet 12 is worn on the user's wrist 14. In this way the locking unit 44 inhibits an unauthorized user 16 from removing the bracelet 12 from the user's wrist 14. The locking unit 44 comprises a control circuit 46 that is integrated into the second prominence 32. The control circuit 46 receives an alert input and the control circuit 46 receives an unlock input. The control circuit 46 includes an electronic memory 48 and the electronic memory 48 stores a database comprising a first fingerprint and a second fingerprint. The first fingerprint corresponds to a fingerprint of the user 16 and the second fingerprint corresponding to a fingerprint of a caregiver assigned to the user 16.

The locking unit 44 includes an electromagnet 50 that is integrated into the first prominence 30. The electromagnet 50 is aligned with the well 36 in the first end 18 of the bracelet 12 and the electromagnet 50 is electrically coupled to the control circuit 46. Furthermore, the electromagnet 50 is in a normally actuated condition. The electromagnet 50 magnetically engages the magnet 42 on the top surface 40 of the tab 38 that is disposed on the second end 20 of the bracelet 12 when the tab 38 is inserted into the well 36 in the first end 18 of the bracelet 12. In this way the first end 18 and the second end 20 are locked together.

The locking unit 44 includes a power supply 52 that is integrated into the bracelet 12. The power supply 52 is electrically coupled to the control circuit 46 and the power supply 52 comprises at least one battery 54. A battery cover 55 is removably integrated into the bottom side 25 of the outer surface 22 of the bracelet 12. The power supply is positioned beneath the battery cover 55 to facilitate the at least one battery 54 to be replaced.

A communication unit 56 is integrated into the bracelet 12 and the communication unit 56 is in communication with an extrinsic communication network 58. The communication unit 56 broadcasts an alert signal when the communication unit 56 is turned on. In this way the communication unit 56 can contact emergency responders for assistance. The emergency responders may be local law enforcement or other agency that can be contacted via 911. The communication unit 56 comprises a transceiver 60 that is integrated into the bracelet 12 and the transceiver 60 is electrically coupled to the control circuit 46. The transceiver 60 broadcasts the alert signal when the control circuit 46 receives the alert input.

The transceiver 60 is in wireless communication with the extrinsic communication network 58. Furthermore, the transceiver 60 is in wireless communication with a personal electronic device 62 that is carried by the caregiver assigned to the user 16. The transceiver 60 broadcasts the alert input to the personal electronic device 62 when the control circuit 46 receives the alert input. Additionally, the transceiver 60 may comprise a radio frequency transceiver or the like and the transceiver 60 may employ a wireless personal area network signal. Furthermore, the extrinsic communication network 58 may comprise the internet, a cellular phone network or other type of wireless communication network. The transceiver 60 can conceivably be placed in communication with any agency, such as a hospital, a health care official or any other individual that would be an appropriate recipient of the alert signal.

A fingerprint scanner 64 is integrated into the bracelet 12 to scan a fingerprint, and the fingerprint scanner 64 is in communication with the locking unit 44. The locking unit 44 is de-actuated when the fingerprint scanner 64 scans a fingerprint of an authorized user thereby facilitating the bracelet 12 to be removed from the user's wrist 14. The fingerprint scanner 64 is integrated into the upper surface 28 of the second prominence 32 on the top side 24 of the outer surface 22 of the bracelet 12 such that the fingerprint scanner 64 can be touched. The fingerprint scanner 64 may comprise an electronic fingerprint scanner of any conventional design.

The fingerprint scanner 64 is electrically coupled to the control circuit 46. The control circuit 46 compares the fingerprint scanned on the fingerprint scanner 64 with the first fingerprint and the second fingerprint stored in the electronic memory 48. The control circuit 46 receives the alert input when the fingerprint scanner 64 scans a fingerprint that matches the first fingerprint stored in the electronic memory 48. In this way the fingerprint scanner 64 facilitates the user 16 to request assistance. The control circuit 46 receives the unlock input when the fingerprint scanner 64 scans a fingerprint that matches the second fingerprint stored in the electronic memory 48. In this way the fingerprint scanner 64 facilitates the caregiver to remove the bracelet 12 from the user's wrist 14.

In use, each of the user's 16 fingerprint and the caregivers fingerprint are scanned into the electronic memory 48 upon initialization of the communication unit 56. The bracelet 12 is worn on the user's wrist 14 and the electromagnet 50 secures the bracelet 12 on the user's wrist 14. The user 16 scans their fingerprint with the fingerprint scanner 64 when the user 16 feels they are in trouble. Thus, the transceiver 60 broadcasts the alert signal to the emergency responders and the personal electronic device 62. In this way, both the emergency responders and the caregiver respond to the user's 16 request for assistance. The electromagnet 50 is turned off when the fingerprint scanner 64 scans the caregiver's fingerprint. In this way the bracelet 12 can be removed from the user's wrist 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. An emergency alert bracelet assembly for discretely broadcasting an alert signal when a user finds themselves in danger, said assembly comprising:

a bracelet being wearable around a wrist of a user;

a locking unit being integrated into said bracelet, said locking unit being actuated to lock said bracelet around the user’s wrist when said bracelet is worn on the user’s wrist wherein said locking unit is configured to inhibit an unauthorized user from removing said bracelet from the user’s wrist;

a communication unit being integrated into said bracelet, said communication unit being in communication with an extrinsic communication network, said communication unit broadcasting an alert signal when said communication unit is turned on wherein said communication unit is configured to contact emergency responders for assistance; and a fingerprint scanner being integrated into said bracelet wherein said fingerprint scanner is configured to scan a fingerprint, said fingerprint scanner being in communication with said locking unit, said locking unit being de-actuated when said fingerprint scanner scans a fingerprint of an authorized user thereby facilitating said bracelet to be removed from the user’s wrist;

wherein said bracelet has a first end a second end and an outer surface extending between said first end and said second end, said outer surface having a top side;

wherein said bracelet has a plurality of prominences each extending upwardly from said to side, each of said prominences having an upper surface;

wherein said upper surface of each of said prominences lies on a plane being oriented parallel with said top side of said outer surface;

wherein said plurality of prominences includes a first prominence, a second prominence and a third prominence;

wherein said first prominence is aligned with said first end;

wherein said locking unit comprises a control circuit being integrated into said second prominence, said control circuit receiving an alert input, said control circuit receiving an unlock input, said control circuit including an electronic memory, said electronic memory storing a database comprising a first fingerprint and a second fingerprint, said first fingerprint corresponding to a fingerprint of the user, said second fingerprint corresponding to a fingerprint of a caregiver assigned to the user;

wherein said communication unit comprises a transceiver being integrated into said bracelet, said transceiver being electrically coupled to said control circuit, said transceiver broadcasting said alert signal when said control circuit receives said alert input, said transceiver being in wireless communication with the extrinsic communication network, wherein said transceiver is in wireless communication with a personal electronic device being carried by a caregiver assigned to the user, said transceiver broadcasting said alert input to the personal electronic device when said control circuit receives said alert input; and wherein said fingerprint scanner is integrated into said upper surface of said second prominence on said to side of said outer surface of said bracelet wherein said fingerprint scanner is configured to be touched, said fingerprint scanner being electrically coupled to said control circuit said control circuit comparing the fingerprint scanned on said fingerprint scanner with the first fingerprint and the second fingerprint stored in said electronic memory.

2. The assembly according to claim 1, wherein said second prominence is centrally positioned between said first end and said second end.

3. The assembly according to claim 1, wherein said third prominence is aligned with said second end.

4. The assembly according to claim 1, wherein:

said first end of said bracelet has a well extending toward said second end; and said bracelet has a tab extending away from said second end, said tab having a top surface, said tab being insertable into said well when said bracelet is worn around the user’s wrist such that said bracelet forms a closed loop; and said locking unit includes an electromagnet being integrated into said first prominence, said electromagnet being aligned with said well in said first end of said bracelet.

5. The assembly according to claim 4, wherein:

said assembly includes a magnet being integrated into said top surface of said tab such that said magnet is positioned within said well in said first end of said bracelet when said tab is inserted into said well; and said electromagnet is electrically coupled to said control circuit, said electromagnet being in a normally actuated condition, said electromagnet magnetically engaging said magnet on said top surface of said tab being disposed on said second end of said bracelet when said tab is inserted into said well in said first end of said bracelet.

6. The assembly according to claim 1, wherein said control circuit receives said alert input when the fingerprint scanner scans a fingerprint that matches said first fingerprint stored in said electronic memory wherein said fingerprint scanner is configured to facilitate the user to request assistance.

7. The assembly according to claim 1, wherein said control circuit receives said unlock input when said fingerprint scanner scans a fingerprint that matches said second fingerprint stored in said electronic memory wherein said fingerprint scanner is configured to facilitate the caregiver to remove said bracelet from the user’s wrist.

8. An emergency alert bracelet assembly for discretely broadcasting an alert signal when a user finds themselves in danger, said assembly comprising:

a bracelet being wearable around a wrist of a user, said bracelet having a first end, a second end and an outer surface extending between said first end and said second end, said outer surface having a top side, said bracelet having a plurality of prominences each extending upwardly from said top side, each of said prominences having an upper surface, said upper surface of each of said prominences lying on a plane being oriented parallel with said top side of said outer surface, said plurality of prominences including a first prominence, a second prominence and a third prominence, said first prominence being aligned with said first end, said second prominence being centrally positioned between said first end and said second end, said third prominence being aligned with said second end, said first end having a well extending toward said second end, said bracelet having a tab extending away from said second end, said tab having a top surface, said tab being insertable into said well when said bracelet is worn around the user's wrist such that said bracelet forms a closed loop;

a magnet being integrated into said top surface of said tab such that said magnet is positioned within said well in said first end of said bracelet when said tab is inserted into said well;

a locking unit being integrated into said bracelet, said locking unit being actuated to lock said bracelet around the user's wrist when said bracelet is worn on the user's wrist wherein said locking unit is configured to inhibit an unauthorized user from removing said bracelet from the user's wrist, said locking unit comprising:

a control circuit being integrated into said second prominence, said control circuit receiving an alert input, said control circuit receiving an unlock input, said control circuit including an electronic memory, said electronic memory storing a database comprising a first fingerprint and a second fingerprint, said first fingerprint corresponding to a fingerprint of the user, said second fingerprint corresponding to a fingerprint of a caregiver assigned to the user;

an electromagnet being integrated into said first prominence, said electromagnet being aligned with said well in said first end of said bracelet, said electromagnet being electrically coupled to said control circuit, said electromagnet being in a normally actuated condition, said electromagnet magnetically engaging said magnet on said top surface of said tab being disposed on said second end of said bracelet when said tab is inserted into said well in said first end of said bracelet; and a power supply being integrated into said bracelet, said power supply being electrically coupled to said control circuit, said power supply comprising at least one battery;

a communication unit being integrated into said bracelet, said communication unit being in communication with an extrinsic communication network, said communication unit broadcasting an alert signal when said communication unit is turned on wherein said communication unit is configured to contact emergency responders for assistance, said communication unit comprising a transceiver being integrated into said bracelet, said transceiver being electrically coupled to said control circuit, said transceiver broadcasting said alert signal when said control circuit receives said alert input, said transceiver being in wireless communication with the extrinsic communication network, said transceiver being in wireless communication with a personal electronic device being carried by a caregiver assigned to the user, said transceiver broadcasting said alert input to the personal electronic device when said control circuit receives said alert input;

a fingerprint scanner being integrated into said bracelet wherein said fingerprint scanner is configured to scan a fingerprint, said fingerprint scanner being in communication with said locking unit, said locking unit being de-actuated when said fingerprint scanner scans a fingerprint of an authorized user thereby facilitating said bracelet to be removed from the user's wrist, said fingerprint scanner being integrated into said upper surface of said second prominence on said top side of said outer surface of said bracelet wherein said fingerprint scanner is configured to be touched, said fingerprint scanner being electrically coupled to said control circuit, said control circuit comparing the fingerprint scanned on said fingerprint scanner with the first fingerprint and the second fingerprint stored in said electronic memory, said control circuit receiving said alert input when the fingerprint scanner scans a fingerprint that matches said first fingerprint stored in said electronic memory wherein said fingerprint scanner is configured to facilitate the user to request assistance, said control circuit receiving said unlock input when said fingerprint scanner scans a fingerprint that matches said second fingerprint stored in said electronic memory wherein said fingerprint scanner is configured to facilitate the caregiver to remove said bracelet from the user's wrist.

* * * * *